United States Patent [19]

Oglesbee

[11] Patent Number: 5,767,657
[45] Date of Patent: Jun. 16, 1998

[54] BATTERY CHARGER HAVING A BATTERY DISCHARGE PREVENTION CIRCUIT

[75] Inventor: John W. Oglesbee, Athens, Ga.

[73] Assignee: Motorola, Inc., Schaumburg, Ill.

[21] Appl. No.: 621,911

[22] Filed: Mar. 26, 1996

[51] Int. Cl.[6] .................. H01M 10/46; H02J 7/06
[52] U.S. Cl. .................. 320/5; 320/49; 320/55
[58] Field of Search .................. 320/2, 5, 9, 10, 320/11, 12, 13, 30, 39, 40, 49, 54, 55

[56] References Cited

U.S. PATENT DOCUMENTS 4,291,266  9/1981  Portmann .................. 320/2
5,039,928  8/1991  Nishi et al. .................. 320/2
5,477,124  12/1995  Tamai .................. 320/39 X

*Primary Examiner*—Edward Tso
*Attorney, Agent, or Firm*—Kenneth M. Massaroni

[57] ABSTRACT

A battery charger (10) avoids discharging a battery (12) when the battery is connected to the charger and the charger is unpowered. The charger comprises a control circuit (18) which is switchably connected to an input power line (26) by a switch (28). The switch is actuated by a circuit which is responsive to the input voltage, and causes the switch to close only when the input voltage is above a preselected level, which is preferably substantially higher than the nominal battery voltage.

15 Claims, 2 Drawing Sheets

5,767,657

BATTERY CHARGER HAVING A BATTERY DISCHARGE PREVENTION CIRCUIT

TECHNICAL FIELD

This invention relates in general to battery chargers, and in particular to battery chargers having a circuit for preventing discharge of a battery connected to the battery charger when the battery charger is not powered.

BACKGROUND

Rechargeable batteries are used with many portable electrical and electronic devices such as portable computers and cellular telephones, for example. Battery chargers recharge these batteries by applying sufficient voltage to the battery to cause an electrical current to flow in the appropriate direction through the battery cells. This makes the battery appear as a load to the charger. All methods of recharging batteries use this fundamental step. However, the charger must be supplied with an input power source to perform this step.

A problem encountered with some chargers occurs when the charger is unpowered and connected to a battery. Under these circumstances the charger, without the benefit of an input power source, acts as a load to the battery, and the battery discharges through the charger's control circuitry. This, of course, is a significant inconvenience if the user of the device believes the battery to still be in a substantially charged state some time after power has been removed from the battery charger. Upon using the battery, the user discovers that the battery has less capacity than expected, and may believe the battery to be defective. A simple means for preventing discharging through the charger is to place a diode in series with the charge current path so that current can only flow in the charge direction. FIG. 1 provides an example of such a charging system.

Referring now to FIG. 1, there is illustrated therein a circuit diagram of a battery charger circuit 10. The charger is connected to a battery 12 to be recharged. Briefly, the charger comprises an input 14 for receiving electrical power, a power switch 16, a control circuit 18, an output section 20, and a blocking diode 22. The charger uses a forward mode switching converter topology to regulate power to the battery according to a preselected charge regime designed into the control circuit 18. When the charger has a minimum level of voltage applied to the input 14, the voltage is higher than the voltage of the battery. The power switch prevents current from freely flowing from the input to the battery. However, once power is removed, without the blocking diode 22, current could flow from the battery, through the power switch, and through the control circuitry, thus discharging the battery.

In some charging systems, the diode is instead placed in a corresponding battery pack, and the battery pack is provided with a set of contacts used only for recharging the battery cells. However, the addition of charger contacts to a battery pack increases the cost of the battery pack, as does the inclusion of a blocking diode. Furthermore, as the battery is recharged, the heat generated by the diode can have a negative effect on the battery, particularly for rapid recharge systems. The heat can interfere with temperature measurements performed by the charger to detect a fully charged condition, and it may have a detrimental effect on the battery cells.

By placing a blocking diode in the charger as shown, these negative effects are, in general, reduced substantially. However, this simply puts the burden of handling the heat generated by the diode on the charger, and it reduces the efficiency of the charger. For example, a charger charging a typical six cell battery pack at one ampere produces about 0.75 watts of power dissipation in the blocking diode. For nickel-cadmium and nickel metal hydride systems, this is equal to about 10% of the power delivered to the battery cells. In attempts to reduce the physical size of chargers, particularly for travel chargers, excess heat produced from a blocking diode is a limiting factor. Furthermore, when a goal of a given battery system is to be physically small, the battery pack may not be able to accomodate the diode, and certainly not the heat produced during charging. Therefore there exists a need for a means by which discharge of the battery is prevented when connected to an unpowered charger, and there exists a simultaneous need to increase the efficiency of the charger containing such discharge preventing means.

DETAILED DESCRIPTION OF THE PREFERRED EMBODIMENT

Figure 1:
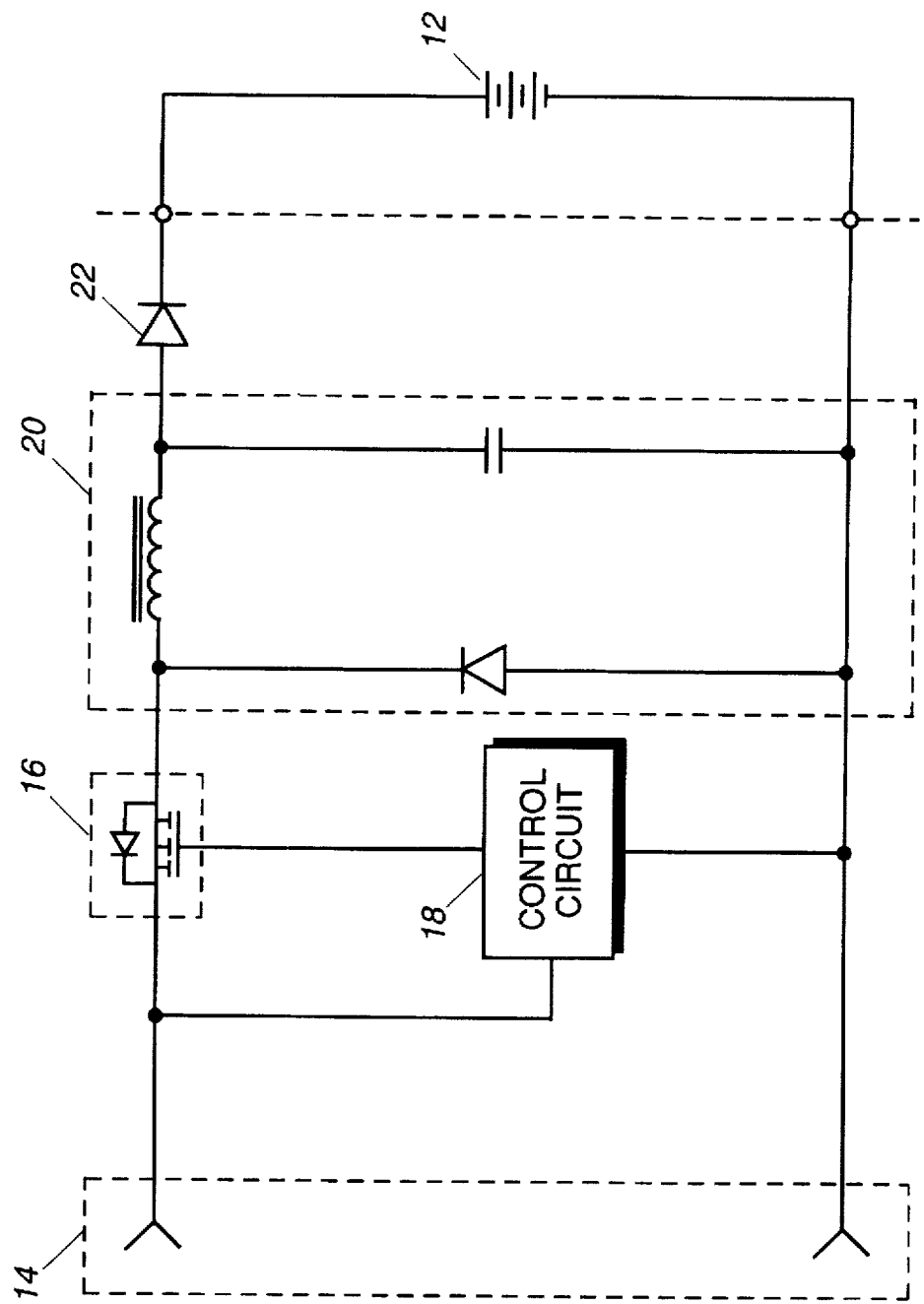
FIG. 1 is a circuit diagram of a battery charger in accordance with the prior art.

While the specification concludes with claims defining the features of the invention that are regarded as novel, it is believed that the invention will be better understood from a consideration of the following description in conjunction with the drawing figures, in which like reference numerals are carried forward.

Figure 2:
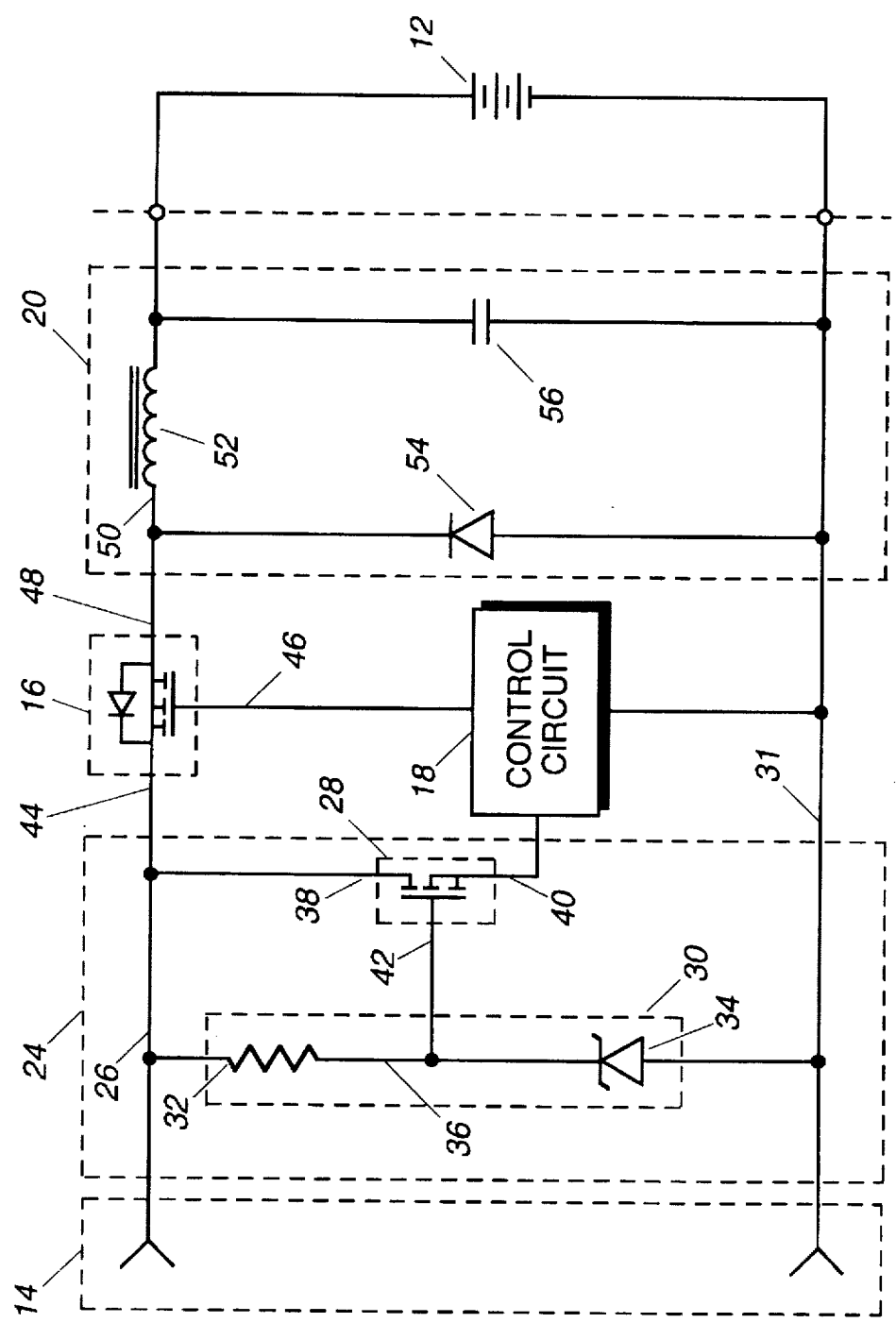
FIG. 2 is a circuit diagram of a battery charger in accordance with the instant invention.

Referring now to FIG. 2, there is illustrated therein a circuit diagram of a battery charger 10 in accordance with the instant invention. The battery charger is similar to that shown in FIG. 1, and comprises common elements of an input 14, a power switch 16, a control circuit 18, and an output section 20. The charger is shown connected to a battery 12, which is to be recharged according to a charge regime provided by the control circuit. However, no blocking diode is used. Instead, an input section 24 is employed. The input section includes the input power line 26, a switch means 28 coupled between the input power line and the control circuit, and a means for actuating 30 the switch means connected between the input power line and the return line 32. The input power line and the return line are also part of the input 14, and a voltage is applied across them so that there is a positive voltage on the input power line with respect to the return line.

The switch means, which is preferably a transistor switch, is off when there is no voltage applied to the input power line, and remains off until the voltage on the input power line is above some preselected voltage level. The preselected voltage level depends on the construction of the battery, and particularly the nominal voltage of the battery. The voltage level at which the switch means should be actuated should be set substantially higher than the nominal voltage of the battery so the battery voltage is not enough to cause the switch means 28 to close. For example, in a six cell nickel cadmium battery, the nominal voltage is typically about 7.5 volts. However, during recharging, depending on the recharge current level, the voltage may climb as high as, for example, 10 volts. Therefore, a preselected level of, for example, 11 volts should prevent the battery from actuating the switch means 28, and an input power source should be selected accordingly.

The circuit means used for actuating the switch means 28 senses the input voltage, and actuates the switch means 28 upon the input voltage exceeding the preselected voltage level. It is preferred that a voltage triggered semiconductor be used for economy and simplicity. An exemplary circuit for actuating the switch means, as illustrated in FIG. 2, comprises a resistor 32 coupled in series with a zener diode 34, thereby defining a control node 36 therebetween. The zener diode is but one form of voltage triggered semiconductor; other examples include thyristors such as diacs and sidacs, and voltage reference diodes such as that manufactured by National Semiconductor Inc. and sold under the trade designation of LM4040. In general, a voltage triggered semiconductor does not conduct any significant current until a trigger voltage threshold has been reached. Once the trigger voltage threshold has been reached, the device begins conducting current.

In the preferred embodiment, the switch means 28 is a P-channel metallic oxide semiconductor field effect transistor (MOSFET), and has a source 38 connected to the input power line 26, a drain 40 connected to the control circuit 18, and a gate 42 connected to the control node 36. The gate acts as a control terminal for the transistor switch. MOSFETs can behave like switches when the source to gate voltage, Vsg, is properly controlled. As is well known, when Vsg is substantially below a defined source to gate threshold voltage, Vsgth, the device acts as a high impedance, similar to an open switch. When Vsg is substantially greater than Vsgth, the device becomes very low impedance, and acts like a closed switch. The transition range of Vsg where the device switches from off to on is typically very narrow. When the input voltage reaches the zener voltage level, Vz, current begins conducting through the resistor 32, thereby creating a voltage drop across the resistor. This voltage drop is evident directly across the switch, and in the preferred embodiment, is applied across the source to gate junction. For clarity, the voltage required to be applied directly across the switch means to actuate the switch shall be referred to as the switch threshold voltage. The preselected voltage level, then, is calculated as the sum of the switch threshold level and the trigger threshold level. In the preferred embodiment, the preselected level is set by Vsgth+Vz. Once the preselected voltage level is determined from the nominal battery voltage, an appropriate zener diode is selected.

As the input voltage rises beyond the zener voltage, the voltage across the resistor increases, and eventually causes the switch to close. In the preferred embodiment, the value of the zener voltage is selected higher than the nominal battery voltage so that the battery does not discharge through the zener diode, and the input power source is selected so that it can supply at least a voltage equal to the sum of the zener voltage and the Vsgth of the switch. When the appropriate voltage level is applied to the input, the switch means 28 closes, and allows power to be applied to the control circuit 18.

The control circuit operates the power switch 16 and also monitors various battery parameter such as battery voltage and battery temperature to regulate power to the battery according to a predetermined charge regime. By charge regime, it is meant the particular method of applying power to the battery, and subsequently determining when to stop charging the battery, or change the power regulation. For example, a well known charge regime in nickel cadmium systems includes charging the battery with a high level constant current, monitoring the temperature of the battery, and terminating the high level constant current when the battery temperature changes at a predetermined rate. The power switch 16 is preferably also a MOSFET, and has a source 44 connected to the input power line, a gate 46 connected to the control circuit, and a drain 48 connected to the output section 20, thereby defining a freewheel node 50 therebetween. Since the charger comprises a forward mode converter, the output section comprises the necessary filter elements of an inductor 52 coupled in series with the power switch, and a freewheel diode 54 connected between the freewheel node and the return line. Additionally, a bulk filter capacitor 56 may be included. The purpose of the output section is well known in the art of power converters, and works in conjunction with the power switch to provide a regulated power source to recharge the battery 12.

The invention solves the problem of a battery discharging through an unpowered charger by disconnecting the input power line from the charger's control circuitry with a switch means 28 when no, or an insufficient input voltage is present. The switch of the switch means only opens when a sufficiently high preselected voltage level, or greater, is applied to the input 14 of the charger. The switch means is responsive to a means for actuating 30, which is responsive to the input voltage level. The invention also provides an efficiency advantage by eliminating the need for a series blocking diode, and thus eliminates the overhead power dissipation associated with a blocking diode. This efficiency gain can allow the physical size of the charger to be smaller by eliminating the need to contend with the heat generated by a blocking diode.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charger having a control circuit, an input power line and a return line, an input voltage between the input power line and the return line, the battery charger comprising:
   switch means coupled between the input power line and the control circuit; and
   a voltage triggered semiconductor responsive to the input voltage for actuating the switch means when the input voltage is above a preselected level.

2. A battery charger as defined by claim 1, wherein the switch means is a transistor switch.

3. A battery charger as defined by claim 2, wherein the transistor switch is a MOSFET having a source connected to the input power line, a drain connected to the control circuit, and a gate connected to the means for actuating.

4. A battery charger as defined by claim 3, wherein the means for actuating comprises a resistor coupled in series with a voltage triggered semiconductor, thereby defining a control node therebetween, the gate of the MOSFET connected to the control node.

5. A battery charger as defined in claim 1, wherein the voltage triggered semiconductor is coupled in series with a resistor between the input power line and the return line.

6. A battery charger as defined by claim 1, wherein the voltage triggered semiconductor is a zener diode.

7. A battery charger for recharging a battery, comprising:
   an input power line and a return line having an input voltage defined therebetween;
   a control circuit for controlling the recharging; and
   a MOSFET transistor switch having a source connected to the input power line, a drain connected to the control circuit, and a gate connected to a voltage triggered semiconductor responsive to the input voltage.

8. A battery charger as defined in claim 7, wherein the voltage triggered semiconductor is coupled in series with a resistor between the input power line and the return line.

9. A battery charger as defined by claim 7, wherein the voltage triggered semiconductor is a zener diode.

10. A battery charger for recharging a battery, and having a return line, the battery charger comprising:

a control circuit;

an input section comprising:

an input power line having an input voltage;

a transistor switch having a control terminal and coupled between the input power line and the control circuit;

a voltage triggered semiconductor coupled in series with a resistor between the input power line and the return line, thereby defining a control node connected to the control terminal of the transistor switch;

an output section for regulating power to the battery;

a power switch coupled in series between the input power line and the output section, the power switch responsive to the control circuit; and wherein the transistor switch is closed when the input voltage is above a preselected voltage level.

11. A battery charger as defined by claim 10, wherein the transistor switch is a MOSFET having a source connected to the input power line, a drain connected to the control circuit, and a gate connected to the control node.

12. A battery charger defined by claim 11, wherein the MOSFET has a source to gate voltage threshold, the voltage triggered semiconductor has a trigger voltage threshold, the preselected voltage level is equal to the sum of the source to gate threshold voltage and the trigger voltage threshold.

13. A battery charger as defined by claim 10, wherein the voltage triggered semiconductor is a zener diode.

14. A battery charger as defined by claim 10, wherein the output section comprises:

an inductor coupled in series with the power switch, thereby defining a freewheel node therebetween; and a freewheel diode coupled between the return line and the freewheel node.

15. A battery charger as defined by claim 10, wherein the power switch is a MOSFET.

* * * * *